United States Patent Office 2,903,737
Patented Sept. 15, 1959

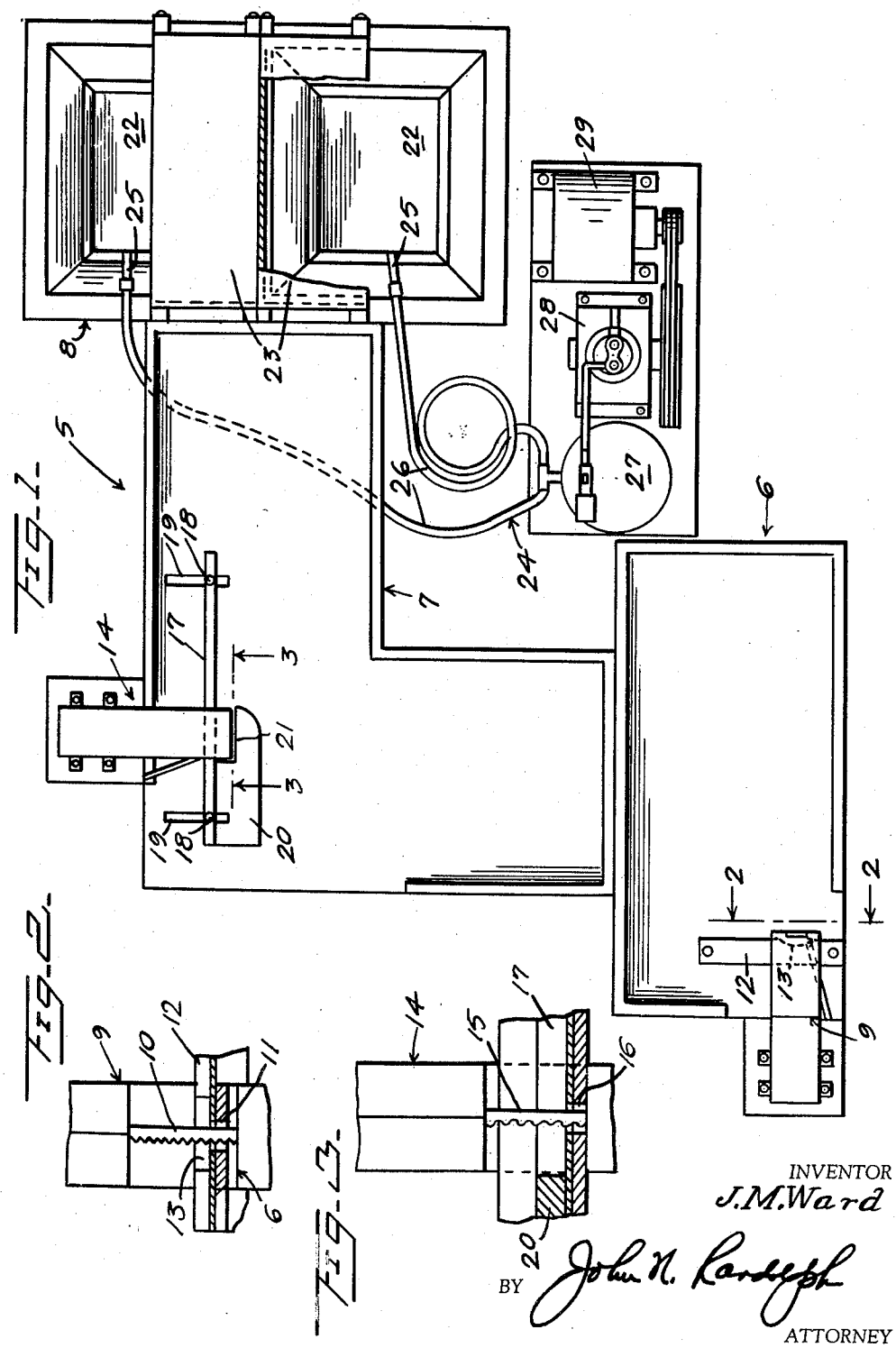

2,903,737
METHOD OF EXTRACTING CRAB MEAT
Jarrett M. Ward, Crisfield, Md.

Original application July 20, 1955, Serial No. 523,179, now Patent No. 2,838,786, dated June 17, 1958. Divided and this application April 4, 1958, Serial No. 726,538

6 Claims. (Cl. 17—45)

This invention relates to a novel method for preparing partially cleaned marine crabs for removing the meat from the crab body, and to the actual removal of the meat from separated sections of the body, and constitutes a division of my co-pending application, Serial No. 523,179, filed July 20, 1955, now Patent No. 2,838,786, issued June 17, 1958.

More particularly, it is an aim of the present invention to provide a novel method whereby the manual labor normally involved in the hand cleaning and picking of marine crabs can be reduced to a minimum, to thereby effect a substantial saving in time and expense involved in recovering the meat from a crab body.

Another object of the invention is to provide a method the practice of which will provide for the recovery of crab meat substantially free from shell particles to thereby materially increase the commercial value of the crab meat.

A further object of the invention is to provide a method of recovering the meat from marine crab bodies, the practice of which will minimize the waste usually occurring in removing the crab meat either by hand picking or through the use of machinery.

Various other objects and advantages of the invention will hereinafter become more fully apparent from the following description of the drawing, illustrating a presently preferred embodiment of an apparatus for use in the practice of the invention, and wherein:

Figure 1 is a top plan view, partly in section, illustrating a preferred embodiment of an apparatus especially adapted to be utilized in practicing the method;

Figure 2 is an enlarged fragmentary vertical sectional view, taken substantially along a plane as indicated by the line 2—2 of Figure 1, and Figure 3 is a similar view, taken substantially along a plane as indicated by the line 3—3 of Figure 1.

Referring more specifically to the drawing, Figure 1 thereof discloses an apparatus designated generally 5 and which is especially adapted for use in the practice of the method constituting the present invention.

The apparatus 5 in general includes a table or similar supporting structure 6, a second table or supporting structure 7, and a supporting frame structure 8.

A band saw 9 is supported by and disposed adjacent one corner of the table 6 and has a blade 10, as best seen in Figure 2, extending through a slot 11 in a portion of the top of the table 6. An elongated bar or cleat 12 is secured to the upper side of the table 6 and is disposed substantially parallel to the plane of the blade 10. The cleat 12 has an arcuate recess 13 located in an edge portion thereof which is disposed adjacent the blade 10, as seen in Figure 2 and in dotted lines in Figure 1.

The table 7 is substantially L-shaped and provides a support for a band saw-type power cutter 14. The power cutter 14 includes an endless flexible cutting blade 15, as seen in Figure 3, which is movable freely through a slot 16 of the table 7. A guide bar or fence 17 is disposed on the upper side of the table 7 adjacent and substantially parallel to the slot 16, and is adjustably secured to the table 7 by fastenings 18 which engage parallel slots 19 in the top of said table. The fastenings 18 when loosened are movable in the slots 19 for adjustment of the guide bar 17 either toward or away from the slot 16. An elongated feed block 20 is loosely disposed on the upper side of the table 7 and is provided with a notch 21 in a forward end thereof. The notch 21 opens outwardly of said forward end and of an inner edge of the block 20, which edge slidably engages the guide bar 17.

The supporting frame structure 8 is preferably of elongated rectangular shape and supports two open top containers 22 which are mounted in the end portions thereof. A pair of shields 23 are mounted on the supporting structure 8 in back to back relation to one another. The shields 23 are disposed over adjacent portions of the containers 22.

The apparatus 5 also includes means 24 for supplying a fluid medium under pressure to the end portions of the supporting structure 8 and which includes nozzles 25, one of which is located adjacent each end of the supporting structure 8. The nozzles 25 are connected by flexible conduits or hoses 26 to a source of a fluid medium under pressure, such as a storage tank 27. A pump 28, which is driven by a motor 29, is provided to recharge the storage tank 27, preferably with compressed air.

The apparatus is utilized in the practice of the method constituting the invention and involving the removal of the meat from the bodies of marine crabs, after the crabs have been hand cleaned. Hand cleaning of crabs involves removal of the claws and legs, apron, shell or carapace, and the viscera, all of which can be very expeditiously accomplished. In the practice of the method, a first operator, not shown, who stands beside the table 6, utilizes band saw blade 10 for cutting off the knuckles from the crabs which have been hand cleaned. This is accomplished by moving one knuckled edge of the crab lengthwise along the arcuate recess 13 in a direction toward the toothed edge of the band saw blade 10, which is being driven downwardly through the slot 11. The knuckled edge is thus guided while being presented to the cutting edge of the blade 10 for cutting off the knuckles along one side of the crab body, after which the crab is turned around and the operation is repeated for cutting off the knuckles from the other edge of the crab body.

After this has been accomplished the crab is placed upon the table 7 from which it is picked up by a second operator who places the crab in the notch 21 with one edge thereof resting on the table 7 and with one side of the body bearing against the longitudinal wall of the notch 21 and the other side of said body bearing against the adjacent side of the guide bar 17. The second operator then moves the feed block 20 from left to right of Figure 1 toward the cutting edge of the blade 15, so that the crab body will be cut substantially in half, midway between the ventral side thereof and the opposite side from which the carapace has been removed. The cutting edge of the blade 15, as seen in Figure 3, constitutes an undulating sharpened edge which will execute a clean slicing cut through the crab body, including the surrounding shell thereof and the longitudinal and transverse partition walls. Consequently, no fragments of these shell walls will be left in the meat of the crab body.

Cutting off of the knuckles is accomplished at what constitutes the first station of the apparatus and the slicing of the body in half, as just described, is performed at a second station of the apparatus. The supporting structure 8 constitutes the third and last station of the apparatus 5 and where two operators may work, one adjacent each end of the supporting structure, and each of whom performs the same operation. Each operator at the third station holds one of the nozzles 25 in one hand and grasps a half of a crab body with the other hand, holding the outer or shell side against the palm of the hand, so that the cut open side will be facing outwardly of the hand. While thus holding the crab half within or adjacent the open top of the adjacent container 22, the compressed air from the nozzle 25 is directed into the open side of the crab body half and in a direction generally toward the open side of the adjacent shield 23. The exposed crab meat will thus be blown out of the shell half and into the container 22 or against the shield 23, from which it will be deflected into said container 22 or from which it can be readily recovered. The crab meat thus separated from the shell will be substantially free of shell particles.

The apparatus illustrated by the drawing and briefly described herein is more fully disclosed in my aforementioned co-pending application, now Patent No. 2,838,786.

Various modifications and changes are contemplated and may be resorted to, without departing from the function or scope of the invention as hereinafter defined by the appended claims.

I claim as my invention:

1. The method of extracting the body meat from a marine crab comprising the step of cutting off the knuckles from the body of a crab from which the legs, claws, carapace and viscera have been previously removed, the step of thereafter cutting the crab body in half substantially midway between upper and lower sides thereof, and the step of removing the meat from the cut halves of the crab body by a fluid force exerted on the cut sides of said halves.

2. A method as in claim 1, wherein the meat is blown from the cut halves of the crab body by the fluid force.

3. A method as in claim 1, wherein the knuckles are cut from the crab body by a saw cut.

4. A method as defined by claim 1, wherein the crab body is cut in half by a slicing cut.

5. A method as defined by claim 1, wherein the crab body is advanced during the cutting operation of cutting the body in half and wherein the cutting is accomplished by a slicing cut in a direction at a right angle to the direction of advancement of the crab body.

6. The method of extracting the body meat from a marine crab comprising the step of cutting off the knuckles from the body of a crab from which the legs, claws, carapace and viscera have been previously removed, the step of thereafter cutting the crab body in half substantially midway between the upper and lower sides thereof, and the step of removing the meat from the cut halves of the crab body by blowing air into the cut sides of said crab body halves.

References Cited in the file of this patent

UNITED STATES PATENTS

| 965,706 | Greiner | July 26, 1910 |
| 1,793,189 | Peters | Feb. 17, 1931 |
| 2,522,578 | Johnson | Sept. 19, 1950 |